(12) United States Patent
Kao et al.

(10) Patent No.: US 6,203,948 B1
(45) Date of Patent: Mar. 20, 2001

(54) STAMPED GRID HAVING OFFSET HORIZONTAL WIRES

(75) Inventors: Wen-Hong Kao, Brown Deer; Edward N. Mrotek, Grafton; Jeffrey L. Troxel, Menomonee Falls, all of WI (US)

(73) Assignee: Johnson Controls Technology Company, Plymouth, MI (US)

(*) Notice: Subject to any disclaimer, the term of this patent is extended or adjusted under 35 U.S.C. 154(b) by 0 days.

(21) Appl. No.: 09/350,854

(22) Filed: Jul. 9, 1999

Related U.S. Application Data

(63) Continuation-in-part of application No. 08/979,984, filed on Nov. 26, 1997, now Pat. No. 5,989,749.

(51) Int. Cl.⁷ .................................................... H01M 4/74
(52) U.S. Cl. ............................................................ 429/241
(58) Field of Search .................................. 29/2; 429/233, 429/241, 242, 243, 244

(56) References Cited

U.S. PATENT DOCUMENTS

| | | | |
|---|---|---|---|
| 1,129,690 | * 2/1915 | Knobloch . | |
| 1,524,610 | 1/1925 | Ahlgren . | |
| 2,079,727 | 5/1937 | Wirtz . | |
| 2,261,053 | * 10/1941 | De Martis et al. . | |
| 2,503,970 | * 4/1950 | Rupp . | |
| 2,881,105 | 4/1959 | Gullett . | |
| 3,009,459 | 11/1961 | Ruben . | |
| 3,408,236 | 10/1968 | Van Hartesveldt . | |
| 3,486,942 | 12/1969 | Hatterschide . | |
| 3,629,388 | 12/1971 | Wolf et al. | 264/219 |
| 3,779,816 | 12/1973 | Mao | 148/6.3 |
| 3,989,539 | 11/1976 | Grabb | 429/241 |
| 4,151,331 | 4/1979 | Hug et al. | 429/94 |
| 4,189,533 | 2/1980 | Sugalski | 429/223 |
| 4,196,757 | 4/1980 | Hug et al. | 141/1.1 |
| 4,199,849 | 4/1980 | Moreau | 29/2 |
| 4,221,032 | 9/1980 | Cousino et al. | 29/2 |

(List continued on next page.)

FOREIGN PATENT DOCUMENTS

| | | | |
|---|---|---|---|
| 0 589 549 | 9/1993 | (EP) | H01M/4/73 |
| 2 127 614 | 4/1984 | (GB) | H01M/4/73 |
| 60-150556 | 8/1985 | (JP) . | |
| WO 99/27595 | 6/1999 | (WO) . | |

OTHER PUBLICATIONS

S. Goodman, "Plates with improved conductivity", *Batteries International*, pp. 88–89, 1994, (Jul.)

*Primary Examiner*—Stephen Kalafut
*Assistant Examiner*—Susy Tsang
(74) *Attorney, Agent, or Firm*—Quarles & Brady LLP

(57) ABSTRACT

A stamped grid for a lead-acid battery having a grid pattern that is optimized for electrical performance. The stamped grid includes an electrically conductive grid body having opposed top and bottom frame elements, opposed first and second side frame elements and a plurality of interconnecting grid wire elements forming a grid pattern. The grid wire elements include a plurality of vertical wire elements connected to both top and bottom frame elements, a plurality of vertical wire elements connected to the top frame element and one of either the first or second side frame elements and a plurality of cross grid elements that interconnect the vertical wire elements. Each of the vertical grid elements that is connected to the top frame element and one of either the first or second side frame elements includes a plurality of the cross frame elements connected thereto at a substantially 90° angle. Optionally, the cross grid elements in the middle portion of the grid are arranged in an offset or staggered relationship. The vertical grid elements and the cross frame elements define open areas for supporting electrochemical paste where most of the open areas are within the two percent of being the same size.

12 Claims, 3 Drawing Sheets

U.S. PATENT DOCUMENTS

| | | | |
|---|---|---|---|
| 4,320,183 | 3/1982 | Qureshi | 429/211 |
| 4,345,452 | 8/1982 | Eberle | 72/452 |
| 4,358,892 | 11/1982 | Turillon et al. | 29/623.5 |
| 4,455,724 | 6/1984 | Sperling et al. | 29/2 |
| 4,477,546 | 10/1984 | Wheeler et al. | 429/211 |
| 5,264,306 | 11/1993 | Walker, Jr. et al. | 429/160 |
| 5,308,719 | 5/1994 | Mrotek et al. | 429/241 |
| 5,350,645 | 9/1994 | Lake et al. | 429/124 |
| 5,506,062 | 4/1996 | Flammang | 428/614 |
| 5,543,250 | 8/1996 | Yanagihara et al. | 429/241 |
| 5,578,398 | 11/1996 | Jenkins et al. | 429/233 |
| 5,582,936 | 12/1996 | Mrotek et al. | 429/241 |
| 5,595,840 | 1/1997 | Henning et al. | 429/210 |
| 5,601,953 * | 2/1997 | Schenk . | |
| 5,989,749 * | 11/1999 | Kao et al. . | |

* cited by examiner

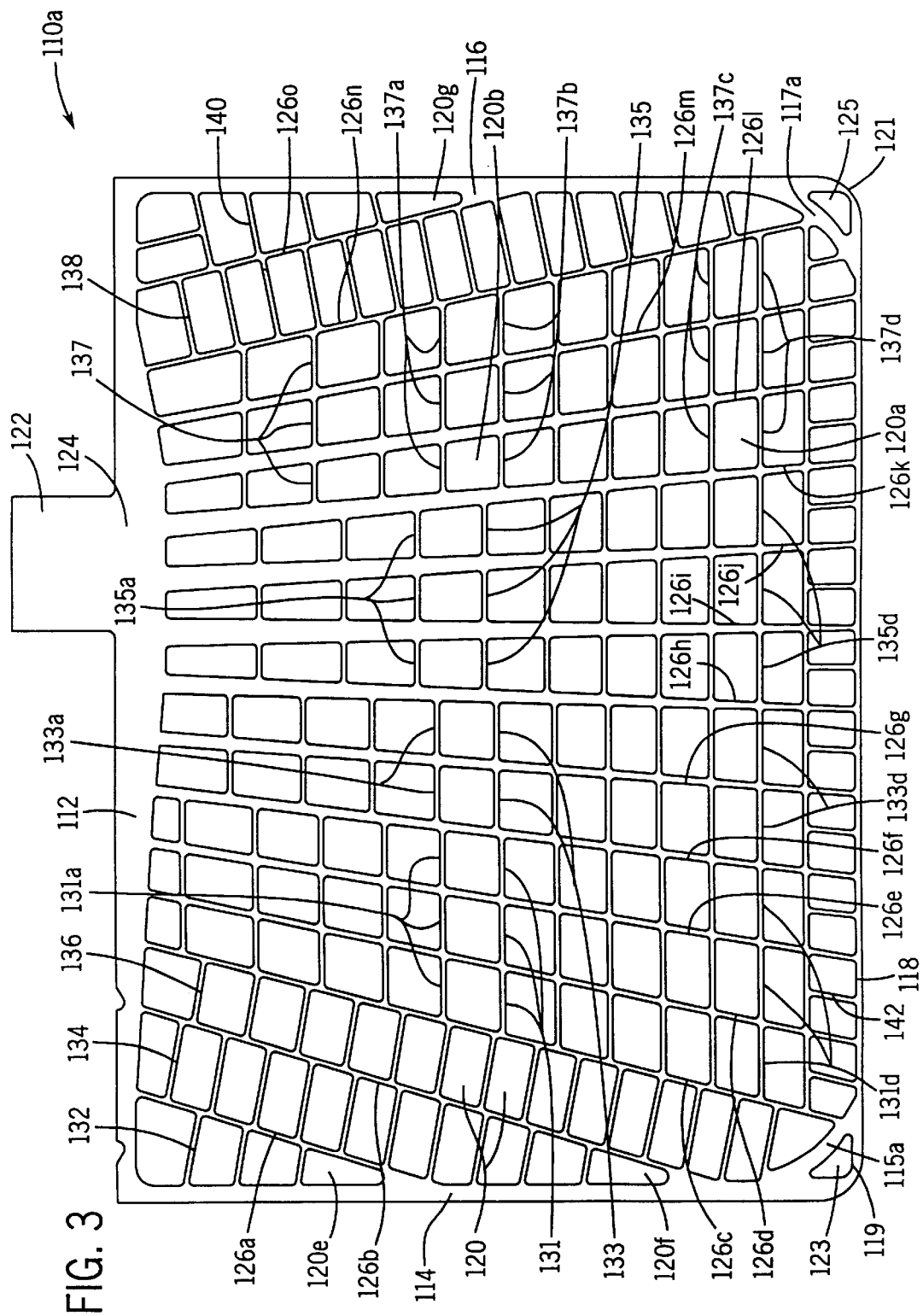

STAMPED GRID HAVING OFFSET HORIZONTAL WIRES

This application is a continuation-in-part of application Ser. No. 08/979,984, filed Nov. 26, 1997, now U.S. Pat. No. 5,989,749.

BACKGROUND OF THE INVENTION

1. Field of the Invention

The present invention relates generally to grids used in a battery and, more particularly, to a stamped battery grid for a lead-acid battery that is configured to optimize electrical performance, reduce weight and maintain battery life characteristics.

2. Description of the Related Art

Grids for lead-acid batteries provide structural support for the active material therein, and also serve as a current collector during discharge and current distributor during recharge of the battery. Accordingly, grid designs seek to optimize the amount of active material supportable by the grid to increase the current collection and distribution characteristics of the grid while minimizing the grid weight. Attempts to optimize the current conducting capabilities while minimizing the weight of the grid have led to numerous grid designs. Manufacturing methods and the disadvantages associated therewith have, however, limited the ability to manufacture even a greater number of grid patterns that have increased conduction capabilities and reduced weight.

Battery grids are commonly manufactured by processes such as casting, expanded metal forming, and stamping. Cast grids have been used for many years and are manufactured by pouring molten lead into a mold, allowing the lead to cool, and then separating the grid from the mold. Cast grids suffer from higher porosity, as compared to expanded metal or wrought grids, and a roughened surface finish. Each of these features may lead to grid corrosion which is a substantial cause of battery failures. Moreover, mold constraints inherent in the casting process limit the wire patterns that may be formed by casting. Further limitations due to mold constraints limit wire shapes and lead distributions that in turn affect grid electrical performance and efficiency. Further disadvantages of the casting process include the need to use a mold coating to facilitate ejection of the grid from the mold, as well as the use of multiple molds to increase production output. These process constraints introduce undesirable grid variations. Finally, the casting process is not "continuous" in the sense that the work material does not pass through the process from start to finish. Rather, work-in-process is collected at each processing station and passed in batches to the next processing stage.

While many disadvantages of the cast grids are addressed by the present invention, of particular concern is the limitations on wire patterns, wire shapes and lead distributions caused by mold constraints. Particularly, casting molds for battery grids generally provide for the infusion of a lead alloy along the horizontal wires of the grid. The lead alloy is introduced into the mold at the ends of recesses for the horizontal wires, and from there the lead alloy flows through the horizontal wire recesses into the connecting vertical wire recesses to form the vertical wires. To ensure complete formation of the vertical grid wires, the spacing between adjacent horizontal wires is limited, thereby limiting the size of the palette that accommodates the paste filler. Moreover, the manufacturing limitations of casting requires that the horizontal wires be continuous and parallel to one another thereby further limiting the grid patterns manufacturable by this process.

Grids are also formed by expanding metal through a process in which a strip of cast or wrought lead material is pierced and then pulled or expanded. Expanded metal grids offer higher productivity than cast processing because the expanded metal process is continuous, i.e., a strip of lead material enters the process and finished grids are the output thereof. However, expanded metal grids are also limited in wire pattern, wire shape, and lead distribution. Additionally, expanded metal grids include stress zones created from the expansion which lead to corrosion. While corrosion may be reduced through the addition of precious metal additives, such as silver, the off-set in corrosion results in an increase in manufacturing costs.

U.S. Pat. No. 5,582,936 issued to Mrotek, et al., assigned to the assignee of the instant invention and herein incorporated by reference, discloses a grid for a lead-acid battery plate that has been formed by a casting process. The Mrotek et al. battery grid includes features to optimize the current flow in the grid, while reducing the amount of lead in the grid to keep the grid weight at a minimum. However, the Mrotek et al. battery grid in the '936 patent suffers from the various disadvantages discussed above that are inherent in the grid casting process.

The present invention incorporates some of the techniques in the '936 patent to optimize the electrical performance and reduce the weight of the grid, and includes additional features to provide other characteristics that are not possible in a cast type grid.

SUMMARY OF THE INVENTION

In accordance with the teachings of the present invention, a stamped grid for a battery system is disclosed that offers improved corrosion capabilities and is optimized for electrical performance over other grids known in the art. The stamped grid includes an electrically conductive grid body having opposed top and bottom frame elements, opposed first and second side frame elements and a plurality of interconnecting grid wire elements forming a grid pattern. The grid wire elements include a plurality of vertical wire elements electrically connected to both the top and bottom frame elements, a plurality of vertical wire elements connected to the top frame element and one of either the first or second side frame element and a plurality of cross grid elements that interconnect the vertical wire elements. The vertical wire elements form a radial pattern directed from a common intersection point. In one embodiment, each of the vertical grid elements that is electrically connected to the top frame element and one of either the first or second side frame elements includes a plurality of the cross grid elements connected thereto at a substantially 90 degree angle. In another specific embodiment, the vertical grid elements and the cross grid elements define open areas for supporting electrochemical paste where most of the open areas are within two percent of being the same size. In yet another specific embodiment, the cross grid elements in the middle portion of the grid are arranged in an offset or staggered relationship.

BRIEF DESCRIPTION OF THE DRAWINGS

The objects and features of this invention will become apparent from a reading of the following detailed description taken in conjunction with the drawings in which:

FIG. 3 is a plan view of a stamped lead-alloy battery grid according to yet another version of the present invention.

DETAILED DESCRIPTION OF THE INVENTION

Figure 1:
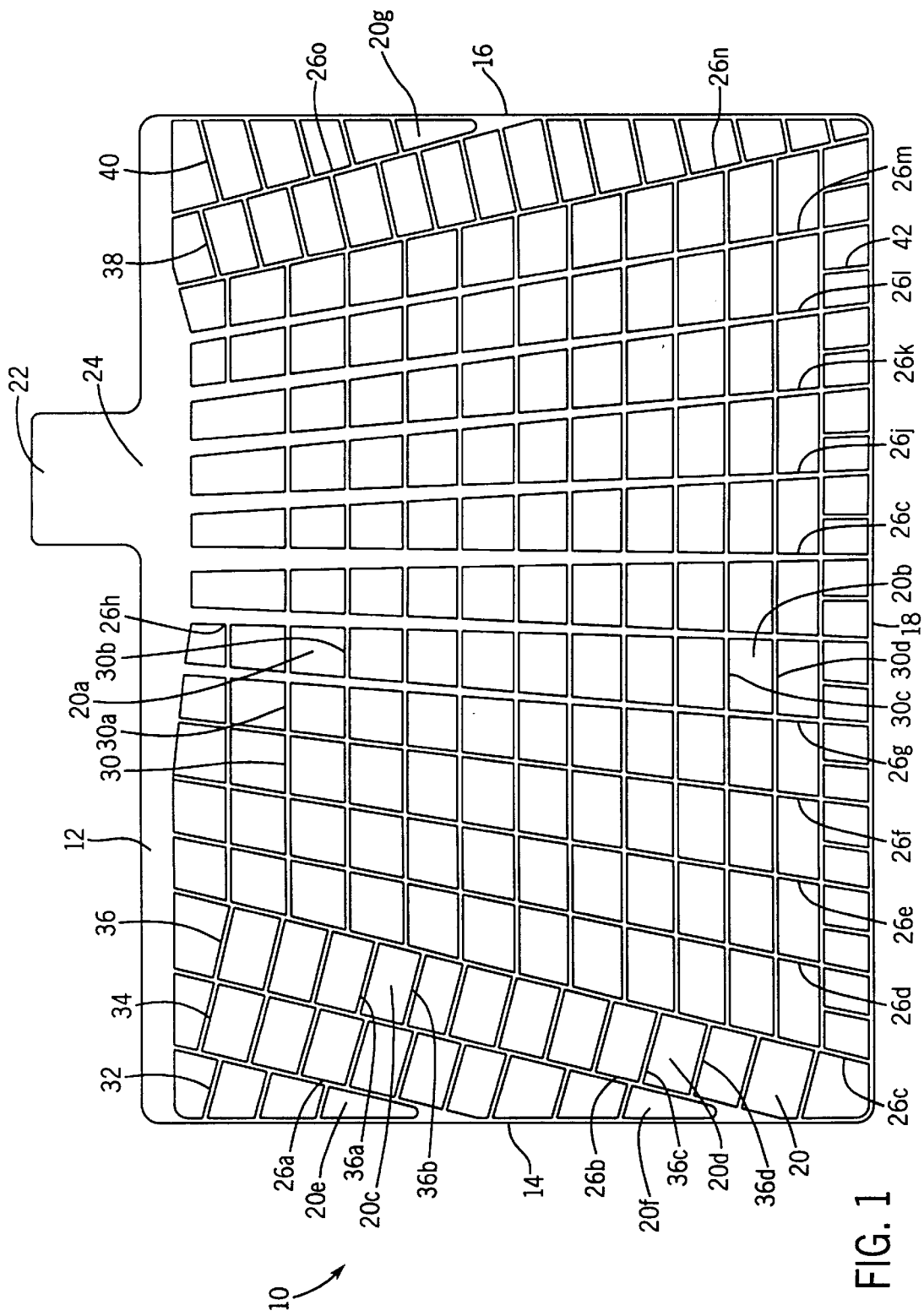
FIG. 1 is a plan view of a stamped lead-alloy battery grid according to one version of the present invention.

The following discussion of the preferred embodiments directed to a stamped grid for a lead-acid battery is merely exemplary in nature, and is in no way intended to limit the invention for its applications or uses.

The present invention is directed to a battery grid formed by a stamping process, that has been optimized for improved corrosion and electrical performance over those grids made by casting or expanded metal processes. The improved corrosion and electrical performance is derived from the grid structure that is formed by the stamping process. These advantages include optimized grid wire patterns, asymmetric and offset grid wire patterns, improved grid wire thickness control (grid wire aspect ratios), improved grid wire shape control, improved lead distribution in the grid (percent lead distribution from the top to the bottom of the grid), and grain control. The corrosion performance is enhanced because of the relatively stress free grain structure and low porosity of the stamped sheet. In addition, the stamping process does not substantially deform the grain or add other stresses into the grid which might lead to corrosion initiation sites. The electrical performance is enhanced as a result of unique and optimized grid wire patterns, improved control of grid wire size and optimized lead distribution within the grid.

The grid is made by stamping, or punching the grid from a continuous sheet of lead material. The sheet may be formed by a continuous casting process or a rolling process depending on which yields the best grain structure for a particular application. The grids are punched to shape while maintaining a continuous strip. The grid shapes will likely result from a progressive punching operation, i.e., features will be added to the grid through several punching operations. The punched strip is processed to add active material (paste) and a paper layer, and then the strip is cut into individual grids. Of course, any particular stamping operation that produces the grid of the present invention is applicable, and is within the scope of the present invention.

The discussion below directed to a battery grid according to the invention has its main application as a grid for a 12-volt lead-acid automobile battery. The discussion below is specific to the grid structure itself, and does not go into a specific application. The grid can be part of a battery plate that may be one of several plates for each of several stacks in a standard battery, as is well understood in the art. Whether the grid is for a positive or negative plate, or whether the batttery includes a certain number of plates or stacks, as well as the specific size of the grid, is dependent upon the particular application. A more complete discussion of the complete battery can be found in the '936 patent. The grid can also be used for other applications, such as an electrode for an electrolysis process. For example, the grid can be used in a chloro-alkali process to make chlorine by an electrical current to make polyvinyl chloride. Also, the grid material, typically a lead alloy, may vary from grid to grid, and also forms no part of the present invention.

FIG. 1 shows a front view of a battery grid 10 that may be part of a positive battery plate, for example, according to an embodiment of the present invention. The grid 10 is a stamped grid made of a lead alloy, and functions in substantially the same manner as the grid disclosed in the '936 patent. The grid 10 includes a top frame element 12, first and second side frame elements 14 and 16, and a bottom frame element 18. The grid 10 includes a series of grid wires, as will be discussed below, that define open areas 20 that hold the electrochemical paste (not shown) that provides the current generation. A current collection lug 22 is integral with the top frame element 12 and is offset from the center of the element 12. The top frame element 12 includes an enlarged conductive section 24 directly beneath the lug 22, and has the shape shown to optimize current conduction to the lug 22. The current collection lug 22 and the enlarged section 24 are shown in the '936 patent.

A series of radially extending vertical grid wire elements 26(a)–26(o) form part of the grid 10, and are substantially configured in the same manner as the vertical wires in the '936 patent. The vertical wire elements 26(c)–26(n) are connected to the top frame element 12 and the bottom frame element 18, the vertical wire elements 26(a) and 26(b) are connected to the top frame element 12 and the first side frame element 14, and the vertical wire element 26(o) is connected to the top frame element 12 and the second side frame element 16, as shown. The vertical wire element 26(i) is parallel to the side elements 14 and 16, and the remaining vertical wire elements 26(a)–26(h) and 26(j)–26(o) extend radially toward an imaginary intersecting point along a radius line running through the vertical element 26(i). The vertical wire elements 26(a)–26(o) become closer together then moving from the bottom element 18 towards the top element 12, and get farther apart when moving towards the left element 14 or the right element 16 from the vertical element 26(i).

The width of the vertical wire elements 26(a)–26(o) increases from the bottom element 18 to the top element 12 to have a tapered shape so as to optimize the current carrying capacity of the wire elements 26(a)–26(o) by the current being generated from the bottom element 18 towards the top element 12. The reduction in the width of the wire elements 26(a)–26(o) towards the bottom element 18, where the current being generated is low, reduces the amount of lead needed, and thus lessens the weight of the battery. The width and spacing of the wire elements 26(a)–26(o) between the side elements 14 and 16 are predetermined so that there are substantially an equal number of potential points across the width of the grid 10. However, the wire elements 26(a)–26(o) can be thinner than the corresponding wires in the '936 patent because the grid 10 is stamped, and thus there is no mold that needs to be optimized for flow of lead to make the grid in the casting process.

The enlarged section 24 increases in size from top to bottom starting at the wire element 26(e) and moving towards the wire element 26(i). Likewise, the enlarged section 24 decreases in size from top to bottom starting at the wire element 26(i) and moving towards the wire element 26(n). These changes in the size and the shape of the enlarged section 24 corresponds to the increased current to be carried to the current collection point of the lug 22, to optimize the efficiency of the current carried by the grid 10. The bigger the cross section of the wire elements in the critical current collection area (below the lug 22) the better the corrosion prevention capabilities, and thus the service life of the grid and battery is extended. Although the amount of lead used in the top frame element 12 is greater than in some designs, the overall lead content in the grid 10 is actually lower since the amount of lead used in the parts of the grid 10 with lower current, such as the wire elements near the bottom portion of the grid 10, is reduced due to the wire elements at the bottom portion being of a lesser width. This supports the feature of substantially equal potential points across the width of the grid 10 in that these points from the center of the lug 22 take the form of essentially an arc to optimize current flow in the grid 10.

The grid in the '936 patent includes a series of horizontal wires that are equally spaced apart and parallel to the top and bottom frame elements of the grid in FIG. 1 of the patent. The majority of the horizontal wires are continuous and are directed straight across the grid, and have this configuration because of the requirements of the casting process. Because the vertical wires are configured radially relative to a center vertical wire, and the horizontal wires are directed straight across the grid, the size of the several open areas defined between the vertical and horizontal wires that hold the conductive paste is different from location to location. Because the open areas have a different area dimension, the power generation in the grid is not uniform, and thus the electrical performance of the battery is not optimized.

The grid also includes a plurality of horizontal or cross wire elements. The cross wire elements include a set of parallel horizontal wire elements 30 positioned in a middle portion of the grid 10. Additionally, the grid 10 includes a first set of cross wire elements 32 connected between the left frame element 14 and the vertical element 26(a) that are parallel to each other, a second set of cross wire elements 34 connected between the vertical elements 26(a) and 26(b) that are parallel to each other, and a third set of cross wire elements 36 connected between the vertical elements 26(b) and 26(c) that are parallel to each other at the left side of the grid 10. Also, the grid 10 includes a fourth set of cross wire elements 38 connected between the vertical elements 26(n) and 26(o) that are parallel to each other and a fifth set of cross wire elements 40 connected between the vertical element 26(o) and the right frame element 16 that are parallel to each other at the right side of the grid 10, as shown. The angles and numbers of sets of the cross wires 30–40 trace the equal potential contours and may vary with the geometry of the particular grid. A series of short support wires 42 are connected to the bottom frame member 18 as shown. The combination of sections of the vertical wire elements 26(a)–26(o) and the horizontal wire elements 30 or the cross wire elements 32–40 define the open areas 20 that support the electrochemical paste for conduction. Although a rectilinear grid pattern can achieve the same open areas, it is known in the art that the rectilinear grid is much inferior to a radial grid design.

Because the grid 10 is a stamped member and not a cast member, the different sets of cross wire elements 30–40 are not aligned with each other to be directed straight across the grid 10, but their position is optimized for electrical performance. In accordance with the present invention, the orientation of the plurality of sets of wire elements 30–40 are spaced relative to each other in a top to bottom direction so that most of the open areas 20 have substantially the same size. In one embodiment, 90 percent or more of the open areas 20 have substantially the same size. In other embodiments for other applications, a higher or lower percent of the open areas 20 can have the same size. Also, for one embodiment, the area size of most of the open areas 20 is within two percent of being the same size. Of course, other embodiments for other applications may have other variances in the size of the open areas 20, such as within ten percent of being the same size.

For example, the distance between the horizontal wire elements 30(a) and 30(b) is greater than the distance between the horizontal wire elements 30(c) and 30(d) because the distance between the vertical wire elements 26(g) and 26(h) varies from the top to the bottom of the grid 10, so that the open areas 20(a) and 20(b) are substantially the same size. Likewise, the open area 20(c) defined by the cross wire elements 36(a) and 36(b) and the vertical wire elements 26(b) and 26(c) is substantially the same size as the open area 20(d) defined by the vertical wire elements 26(b) and 26(c) and the cross wire elements 36(c) and 36(d). The cross wire elements 30–40 are positioned so that almost all of the open areas 20 have substantially the same area dimension. This includes the triangular open areas 20(e), 20(f) and 20(g) defined by the side elements 14 and 16 and the respective vertical wire elements and cross wire elements. A few of the open areas near the enlarged section 24 do not satisfy this criteria because of the increased current collection at this area. Because almost all of the open areas 20 have substantially the same size, there is uniform power generation across the entire grid 10 providing increased electrical optimization.

Additionally, because the grid 10 is stamped, the separate cross wire elements 32–40 do not have to be aligned with each other and can be oriented perpendicular to the respective vertical element 26(a), 26(b), 26(c), 26(n) and 26(o). In other words, instead of making the cross wire elements perpendicular to the side elements as in the '936 patent, the cross elements 32 and 40 are connected to the respective side frame elements 14 and 16 at an angle thereto. The cross elements 32 are perpendicular to the vertical element 26(a), the cross elements 34 are perpendicular to the vertical elements 26(a) and 26(b), the cross elements 36 are perpendicular to the vertical elements 26(b) and 26(c), the cross elements 38 are perpendicular to the vertical elements 26(n) and 26(o), and the cross elements 40 are perpendicular to the vertical element 26(o). Because these cross elements can be connected perpendicular to the respective vertical wire elements, the cross elements are shorter than the corresponding cross elements disclosed in the '936 patent, and thus have a decrease in weight. Also, by connecting the cross wire elements 30–40 to the vertical elements at substantially 90°, the process for adding the paste is made easier because the sharp angles in the open areas 20 are reduced or eliminated.

Figure 2:
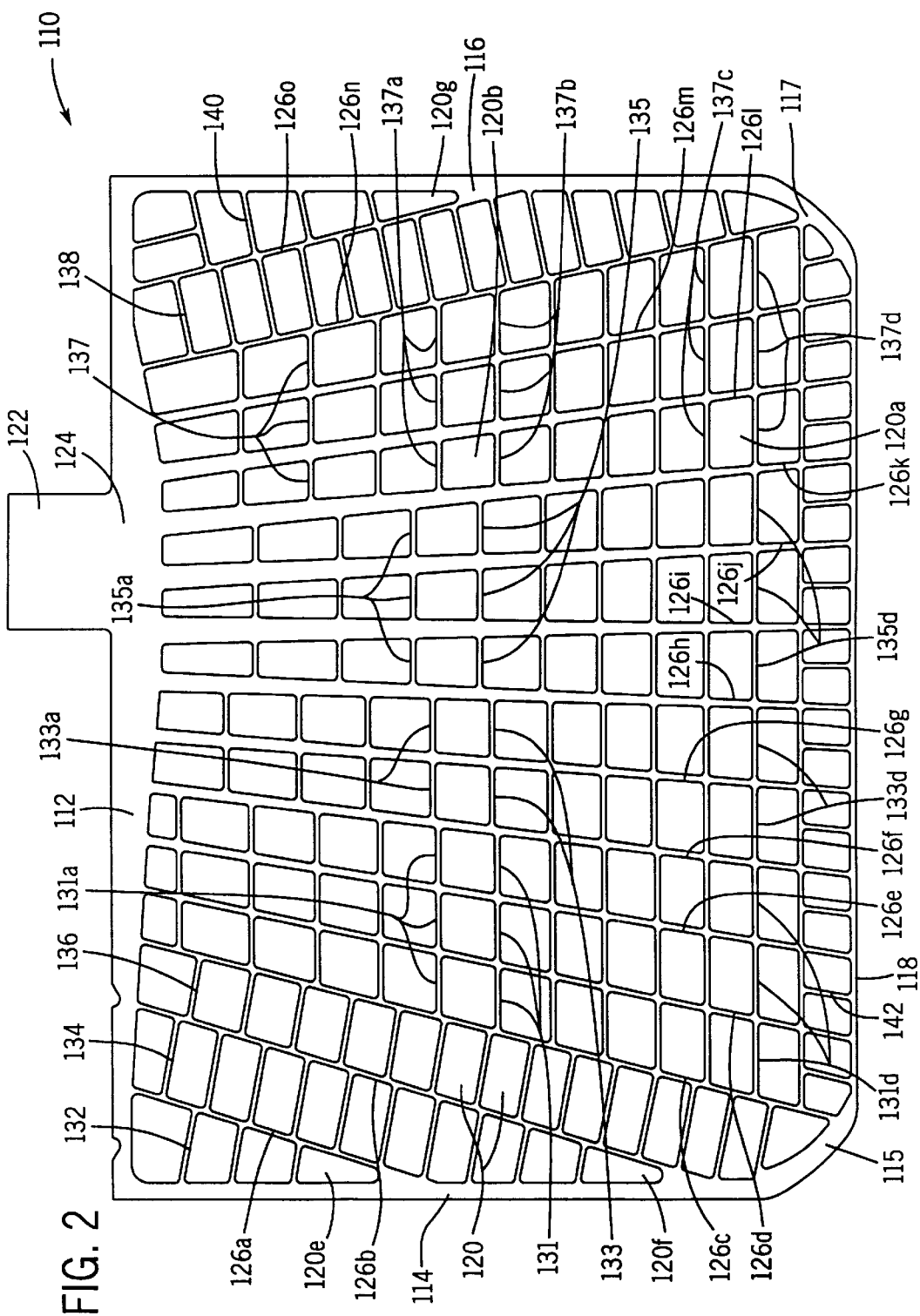
FIG. 2 is a plan view of a stamped lead-alloy battery grid according to another version of the present invention.

Turning now to FIG. 2, there is shown a front view of another battery grid 110 that may be part of a positive battery plate, for example, according to a second embodiment of the present invention. The grid 110 is a stamped grid made of a lead alloy, and functions in substantially the same manner as the grid disclosed in the '936 patent. The grid 110 includes a top frame element 112, a first side frame element 114 having a rounded lower corner 115, a second side frame element 116 having a rounded lower corner 117, and a bottom frame element 118. The grid 110 includes a series of grid wires, as will be discussed below, that define open areas 120 that hold the electrochemical paste (not shown) that provides the current generation. A current collection lug 122 is integral with the top frame element 112 and is offset from the center of the element top frame 112. The top frame element 112 includes an enlarged conductive section 124 directly beneath the lug 122, and has the shape shown to optimize current conduction to the lug 122. The current collection lug 122 and the enlarged section 124 are shown in the '936 patent.

A series of radially extending vertical grid wire elements 126(a)–126(o) form part of the grid 110, and are substantially configured in the same manner as the vertical wires 26(a)–26(o) in the embodiment of the invention shown in FIG. 1. The vertical wire elements 126(d)–126(m) are connected to the top frame element 112 and the bottom frame element 118, the vertical wire elements 126(a)–126(c) are connected to the top frame element 112 and the first side frame element 114, and the vertical wire elements 126(n)–126(o) are connected to the top frame element 112 and the second side frame element 116, as shown. The vertical wire element 126(i) is parallel to the straight portions of side elements 114 and 116, and the remaining vertical wire elements 126(a)–126(h) and 126(j)–126(o) extend radially toward an imaginary intersecting point along a radius line running through the vertical element 126(i). The vertical wire elements 126(a)–126(o) become closer together when moving from the bottom element 118 towards the top element 112, and get farther apart when moving towards the left side frame element 114 or the right side frame element 116 from the vertical element 126(i).

The width of the vertical wire elements 126(a)–126(o) increases from the bottom element 118 to the top element 112 to have a tapered shape so as to optimize the current carrying capacity of the wire elements 126(a)–126(o) by the current being generated from the bottom element 118 towards the top element 112. The reduction in the width of the wire elements 126(a)–126(o) towards the bottom element 118, where the current being generated is low, reduces the amount of lead needed, and thus lessens the weight of the battery. The width and spacing of the wire elements 126(a)–126(o) between the side elements 114 and 116 are predetermined so that there are substantially an equal number of potential points across the width of the grid 110. However, the wire elements 126(a)–126(o) can be thinner than the corresponding wires in the '936 patent because the grid 110 is stamped, and thus there is no mold that needs to be optimized for flow of lead to make the grid in the casting process.

The enlarged section 124 increases in size from top to bottom starting at the wire element 126(e) and moving towards the wire element 126(i). Likewise, the enlarged section 124 decreases in size from top to bottom starting at the wire element 126(i) and moving towards the wire element 126(n). These changes in the size and the shape of the enlarged section 124 correspond to the increased current to be carried to the current collection point of the lug 122, to optimize the efficiency of the current carried by the grid 110. The bigger the cross section of the wire elements in the critical current collection area (below the lug 122) the better the corrosion prevention capabilities, and thus the service life of the grid and battery is extended. Although the amount of lead used in the top frame element 112 is greater than in some designs, the overall lead content in the grid 110 is actually lower since the amount of lead used in the parts of the grid 110 with lower current, such as the wire elements near the bottom portion of the grid 110, is reduced due to the wire elements at the bottom portion being of a lesser width. This supports the feature of substantially equal potential points across the width of the grid 110 in that these points from the center of the lug 122 take the form of essentially an arc to optimize current flow in the grid 110.

The grid in the '936 patent includes a series of horizontal wires that are equally spaced apart and parallel to the top and bottom frame elements of the grid in FIG. 1 of the '936 patent. The majority of the horizontal wires are continuous and are directed straight across the grid, and have this configuration because of the requirements of the casting process. Because the vertical wires are configured radially relative to a center vertical wire, and the horizontal wires are directed straight across the grid, the size of the several open areas defined between the vertical and horizontal wires that hold the conductive paste is different from location to location. Because the open areas have a different area dimension, the power generation in the grid is not uniform, and thus the electrical performance of the battery is not optimized.

The grid of FIG. 2 also includes a plurality of horizontal or cross wire elements. The cross wire elements include: a first set of cross wire elements 132 connected between the left frame element 114 and the vertical element 126(a) that are parallel to each other; a second set of parallel cross wire elements 134 connected between the vertical elements 126(a) and 126(b) at the upper portion of the grid 110 and connected between the left frame element 114 and the vertical element 126(b) at the lower portion of the grid 110; a third set of parallel cross wire elements 136 connected between the vertical elements 126(b) and 126(c) at the upper portion of the grid 110 and connected between the left frame element 114 and the vertical element 126(c) at the lower portion of the grid 110; a fourth set of parallel cross wire elements 131 connecting vertical elements 126(c) and 126(f); a fifth set of parallel cross wire elements 133 connecting vertical elements 126(f) and 126(h); a sixth set of parallel cross wire elements 135 connecting vertical elements 126(h) and 126(k) ; a seventh set of parallel cross wire elements 137 connecting vertical elements 126(k) and 126(n); an eighth set of parallel cross wire elements 138 connected between the vertical elements 126(n) and 126(o) at the upper portion of the grid 110 and connected between the right frame element 116 and the vertical element 126(n) at the lower portion of the grid 110; and a ninth set of parallel cross wire elements 140 connected between the vertical element 126(o) and the right frame element 116 of the grid 110.

The angles and numbers of sets of the cross wires 131–140 trace the equal potential contours and may vary with the geometry of the particular grid. A series of short support wires 142 are connected to the bottom frame member 118 as shown. The combination of sections of the vertical wire elements 126(a)–126(o) and the horizontal wire elements 131–140 define the open areas 120 that support the electrochemical paste for conduction. Because the grid 110 is a stamped member and not a cast member, the different sets of cross wire elements 131–140 are not aligned with each other to be directed straight across the grid 110, but their position is optimized for electrical performance. In accordance with the present invention, the orientation of the plurality of sets of wire elements 131–140 are spaced relative to each other in a top to bottom direction so that most of the open areas 120 have substantially the same size. In the embodiment of FIG. 2, at least 90 percent, and preferably at least 95 percent, of the open areas 120 have substantially the same size. In other embodiments for other applications, a higher or lower percent of the open areas 120 can have the same size. Also, for one embodiment, the area size of most of the open areas 120 is within two percent of being the same size. Of course, other embodiments for other applications may have other variances in the size of the open areas 120, such as within ten percent of being the same size.

For example, the distance between the horizontal wire elements 137(a) and 137(b) is greater than the distance between the horizontal wire elements 137(c) and 137(d) because the distance between the vertical wire elements 126(k)–126(n) varies from the top to the bottom of the grid 110, so that the open areas 120(a) and 120(b) are substantially the same size. The cross wire elements 131–140 are positioned so that almost all of the open areas 120 have substantially the same area dimension. This includes the triangular open areas 120(e), 120(f) and 120(g) defined by the side elements 114 and 116 and the respective vertical wire elements and cross wire elements. A few of the open areas near the enlarged section 124 do not satisfy this criteria because of the increased current collection at this area. Because almost all of the open areas 120 have substantially the same size, there is uniform power generation across the entire grid 110 providing increased electrical optimization.

Additionally, because the grid 110 is stamped, the separate cross wire elements 132, 134, 136, 138 and 140 do not have to be aligned with each other and can be oriented perpendicular to the respective vertical element 126(*a*), 126(*b*), 126(*c*), 126(*n*) and 126(*o*). In other words, instead of making the cross wire elements perpendicular to the side elements as in the '936 patent, the cross elements 132 and 140 are connected to the respective side frame elements 114 and 116 at an angle thereto. The cross elements 132 are perpendicular to the vertical element 126(*a*), the cross elements 134 are perpendicular to the vertical elements 126(*a*) and 126(*b*), the cross elements 136 are perpendicular to the vertical elements 126(*b*) and 126(*c*), the cross elements 138 are perpendicular to the vertical elements 126(*n*) and 126(*o*), and the cross elements 140 are perpendicular to the vertical element 126(*o*). Because these cross elements can be connected perpendicular to the respective vertical wire elements, the cross elements are shorter than the corresponding cross elements disclosed in the '936 patent, and thus have a decrease in weight. Also, by connecting the cross wire elements 132, 134, 136, 138 and 140 to the vertical elements at substantially 90°, the process for adding the paste is made easier because the sharp angles in the open areas 120 are reduced or eliminated.

Furthermore, because the grid 110 is stamped, the separate cross wire elements 131, 133, 135 and 137 in the middle portion of the grid 110 do not have to be aligned with each other and can be oriented in an offset manner with respect to vertical elements 126(*c*) to 126(*n*). In other words, instead of making the cross wire elements in the middle portion of the grid continuous from vertical element 126(*c*) to 126(*n*) as in the '936 patent, the cross wire elements 131, 133, 135 and 137 in the middle portion of the grid 110 can be arranged in a staggered relationship. This staggered relationship of the cross wire elements 131, 133, 135 and 137 can be seen by comparing cross wire elements 131(*d*), 133(*d*), 135(*d*) and 137(*d*) with cross wire elements 131(*a*), 133(*a*), 135(*a*) and 137(*a*) in FIG. 2.

First, looking at cross wire elements 131(*d*), 133(*d*), 135(*d*) and 137(*d*), it can be seen that the cross wire elements 131(*d*), 133(*d*), 135(*d*) and 137(*d*) are continuous from vertical wire element 126(*c*) to vertical wire element 126(*n*). In other words, a straight line would pass through cross wire elements 131(*d*), 133(*d*), 135(*d*) and 137(*d*) from vertical wire element 126(*c*) to vertical wire element 126(*n*). Now, looking at cross wire elements 131(*a*), 133(*a*), 135(*a*) and 137(*a*), it can be seen that the cross wire elements 131(*a*), 133(*a*), 135(*a*) and 137(*a*) are arranged in an offset, staggered relationship such that the cross wire elements 131(*a*), 133(*a*), 135(*a*) and 137(*a*) are not continuous from vertical wire element 126(*c*) to vertical wire element 126(*n*). When traversing cross wire elements 131(*a*), 133(*a*), 135(*a*) and 137(*a*) from vertical wire element 126(*c*) to vertical wire element 126(*n*), it can be seen that: cross wire elements 131(*a*) extend in a continuous manner between vertical wire elements 126(*c*) and 126(*f*); cross wire elements 133(*a*) extend in a continuous manner between vertical wire elements 126(*f*) and 126(*h*); cross wire elements 135(*a*) extend in a continuous manner between vertical wire elements 126(*h*) and 126(*k*); and cross wire elements 137(*a*) extend in a continuous manner between vertical wire elements 126(*k*) and 126(*n*). However, when traversing cross wire elements 131(*a*), 133(*a*), 135(*a*) and 137(*a*) from vertical wire element 126(*c*) to vertical wire element 126(*n*), all of cross wire elements 131(*a*), 133(*a*), 135(*a*) and 137(*a*) would not contact a straight line between vertical wire element 126(*c*) and vertical wire element 126(*n*). Because the grid 110 of FIG. 2 is a stamped grid, the horizontal wires in the center of the grid do not have to be continuous and directed straight across the grid as in a grid manufactured using a casting process. In the grid 110 of FIG. 2, it can also be seen that the cross wire elements 131, 133, 135 and 137 are offset in a greater manner adjacent top frame element 112. Although the offset cross wire elements 131, 133, 135 and 137 in the center of the grid shown in FIG. 2 are arranged in groups, grouping of cross wires is not required and each cross wire may be offset individually.

The offsetting of the cross wires 131, 133, 135 and 137 provides certain advantages. By offsetting horizontal wires in the center of the grid, the open areas in the grid can be controlled even further such that a larger portion of the open areas are the same size. In addition, by offsetting horizontal wires in the center of the grid, the open areas near the lug can be optimized such that when the grid is pasted, more active material is placed near the lug where resistance is the lowest. Furthermore, the offsetting of cross wires 131, 133, 135 and 137 in the grid 110 of FIG. 2 allows the grid 110 to have one less row of cross wires than the grid of FIG. 1. This leads to a savings in grid material. Another advantage of offsetting horizontal wires in the center of the grid is a decrease in the harmful effects of grid growth during battery life. By offsetting the horizontal wires, corrosion and accompanying grid growth of a positive plate tend to deform the vertical wires in a serpentine fashion rather than move the vertical wires in a parallel fashion toward the side frames. This decreases the possibility that a grid will growth extensively outside the perimeter of a separator.

Turning to FIG. 3, an alternative version of the grid of FIG. 2 is shown. The grid 110*a* of FIG. 3 is similar in all respects to the grid 110 in FIG. 2 except that in the grid 110*a* of FIG. 3, the left frame 114 and the bottom frame 118 meet in an approximately square corner section 119 and the right frame 116 and the bottom frame 118 meet in an approximately square corner section 121. An opening 123 is thereby formed between the square corner section 119 and the rounded section 115*a* (which serves as the left lower corner 115 in the grid of FIG. 2). Also, an opening 125 is formed between the square corner section 121 and the rounded section 117*a* (which serves as the right lower corner 117 in the grid of FIG. 2). The square corner sections 119 and 121 allow the grid 110*a* to function as a grid that has four square corners and to also be modified (by removal of corner sections 199 and 121) to function as a grid with rounded lower corners.

Although the present invention has been described in considerable detail with reference to certain preferred embodiments, one skilled in the art will appreciate that the present invention can be practiced by other than the preferred embodiments, which have been presented for purposes of illustration and not of limitation. Therefore, the spirit and scope of the appended claims should not be limited to the description of the preferred embodiments contained herein.

What is claimed is:

1. A grid for a battery comprising:
   an electrically conductive grid body having opposed top and bottom frame elements and opposed first and second side frame elements; and
   a plurality of interconnecting electrically conductive grid elements defining a grid pattern defining a plurality of open areas, the interconnecting grid elements including a plurality of radially extending vertical grid wire elements connected to the top frame element, a first portion of the radially extending vertical grid wire elements being connected to the top frame element and the first side frame element, the first portion of the radially extending vertical grid wire elements including a first innermost vertical grid wire element located furthest from the first side frame element, a second portion of the radially extending vertical grid wire elements being connected to the top frame element and the second side frame element, the second portion of the radially extending vertical grid wire elements including a second innermost vertical grid wire element located furthest from the second side frame element, and a third portion of the radially extending vertical grid wire elements located between the first portion of the radially extending vertical grid wire elements and the second portion of the radially extending vertical grid wire elements, the third portion of the radially extending grid wire elements being connected to the top frame element and the bottom frame element, and a plurality of spaced-apart cross wire grid elements, a first set of the spaced-apart cross wire grid elements extending between the first side frame and the first innermost vertical grid wire element, a second set of the spaced-apart cross wire grid elements extending between the first innermost and the second innermost vertical grid wire elements, and a third set of the spaced-apart cross wire grid elements extending between the second side frame and the second innermost vertical grid wire element, wherein a plurality of the second set of cross wire grid elements are connected to the third portion of the radially extending vertical grid wire elements in a staggered manner so that the plurality of the second set of cross wire grid elements that are connected to the third portion of the radially extended vertical grid elements in a staggered manner are not continuous.

2. The grid of claim 1 wherein:

a plurality of the first set of cross wire grid elements are connected to the first portion of the radially extending vertical grid wire elements in a staggered manner and a plurality of the third set of cross wire grid elements are connected to the second portion of the radially extending vertical grid wire elements in a staggered manner so that the plurality of the first set of the cross wire grid elements that are connected to the first portion of the radially extended vertical grid elements in a staggered manner and the plurality of the third set of the cross wire grid elements that are connected to the second portion of the radially extended vertical grid wire elements in a staggered manner are not continuous.

3. The grid of claim 2 wherein:

the first set of the cross wire grid elements are connected to the first portion of the radially extending vertical grid wire elements at substantially a 90° angle to the first portion of the radially extending vertical grid wire elements, and the third set of the cross wire grid elements are connected to the second portion of the radially extending vertical grid wire elements at substantially a 90° angle to the second portion of the radially extending vertical grid wire elements.

4. The grid of claim 1 wherein:

the first side frame element and the second side frame element each include a lower corner having a rounded shape.

5. The grid of claim 1 wherein:

the first side frame element and the second side frame element each include a lower corner having a substantially square shape.

6. The grid of claim 1 wherein:

the radially extending vertical grid wire elements in the third portion of the radially extending vertical grid wire elements have a varying width which increases from a bottom of the grid wire element connected to the bottom frame element to a top of the grid wire element connected to the top frame element.

7. The grid of claim 1 wherein:

at least 95% of the open areas are within ten percent of the being the same size.

8. The grid of claim 1 wherein:

the second set of the cross wire grid elements are connected to the third portion of the radially extending vertical grid wire elements such that the second set of the cross wire grid elements are parallel.

9. A grid for a battery comprising:

an electrically conductive grid body having opposed top and bottom frame elements and opposed first and second side frame elements; and a plurality of interconnecting electrically conductive grid elements defining a grid pattern defining a plurality of open areas, the interconnecting grid elements including a plurality of radially extending vertical grid wire elements connected to the top frame element, a first portion of the radially extending vertical grid wire elements being connected to the top frame element and the bottom frame element, and a plurality of spaced-apart cross wire grid elements extending between the first side frame and the second side frame wherein a plurality of cross wire grid elements that are connected to the first portion of the radially extending vertical grid wire elements are connected in a staggered manner so that the cross wire grid elements that are connected to the first portion of the radially extending vertical grid wire elements in a staggered manner are not continuous.

10. The grid of claim 9 wherein:

the radially extending vertical grid wire elements in the first portion of the radially extending vertical grid wire elements have a varying width which increases from a bottom of the grid wire element connected to the bottom frame element to a top of the grid wire element connected to the top frame element.

11. The grid of claim 9 wherein:

at least 95% of the open areas are within ten percent of the being the same size.

12. The grid of claim 9 wherein:

the plurality of radially extending vertical grid wire elements connected to the top frame element includes a second portion of radially extending vertical grid wire elements connected to the top frame element and the first side frame element and a third portion of radially extending vertical grid wire elements connected to the top frame element and the second side frame element.

* * * * *